(12) United States Patent
Miura et al.

(10) Patent No.: US 9,669,792 B2
(45) Date of Patent: Jun. 6, 2017

(54) AIR BAG CASE

(71) Applicant: TOYODA GOSEI CO., LTD., Kiyosu-shi, Aichi-ken (JP)

(72) Inventors: Wataru Miura, Kiyoshu (JP); Ryuji Masudome, Kiyoshu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/059,455

(22) Filed: Mar. 3, 2016

(65) Prior Publication Data

US 2016/0257275 A1    Sep. 8, 2016

(30) Foreign Application Priority Data

Mar. 6, 2015  (JP) .................................. 2015-044946

(51) Int. Cl.
  *B60R 21/16*    (2006.01)
  *B60R 21/217*   (2011.01)
(52) U.S. Cl.
  CPC .................................. *B60R 21/217* (2013.01)
(58) Field of Classification Search
  CPC .......... B60R 21/205; B60R 2021/2173; B60R 21/2176; B60R 21/26; B60R 2021/26076
  USPC ....................... 280/728.2, 732, 740, 741, 742
  See application file for complete search history.

(56) References Cited

U.S. PATENT DOCUMENTS

| | | | | |
|---|---|---|---|---|
| 5,487,560 A | * | 1/1996 | Emambakhsh | ........ B60R 21/233 280/740 |
| 5,851,023 A | * | 12/1998 | Nagata | ................ B60R 21/2171 280/728.2 |
| 6,126,191 A | * | 10/2000 | Pepperine | ........... B60R 21/2171 280/728.2 |
| 6,336,661 B1 | | 1/2002 | Amamori | |

(Continued)

FOREIGN PATENT DOCUMENTS

| DE | 100 41 763 A1 | 12/2001 |
|---|---|---|
| DE | 10 2005 010 324 A1 | 9/2006 |

(Continued)

OTHER PUBLICATIONS

Office Action dated Jun. 28, 2016 in the corresponding German Patent Application No. 10 2016 002 663.4 (and English translation).

*Primary Examiner* — Toan To
(74) *Attorney, Agent, or Firm* — Posz Law Group, PLC

(57) ABSTRACT

An air bag case includes: a bottom wall portion including a bottom wall configuring portion; a side wall portion including a side wall configuring portion, wherein: the side wall configuring portion is bent so as to rise from an outer circumferential edge of the bottom wall configuring portion of the single metallic sheet material; a plurality of joining piece portions, provided on the side wall configuring portion, are superposed on corresponding joined portions to be crimped together to thereby maintain a rising shape of the side wall portion from the bottom wall portion; and the joining piece portions are disposed substantially parallel to the bottom wall portion together with the joined portions and (Continued)

are superposed on the joined portions so that the joining pieces portions and the joined portions are partially crimped together in a direction which is substantially at right angles to the bottom wall portion.

4 Claims, 13 Drawing Sheets

(56) References Cited

U.S. PATENT DOCUMENTS

| | | | | |
|---|---|---|---|---|
| 8,641,081 B2* | 2/2014 | Yamada | ............... | B60R 21/2176 280/728.2 |
| 9,033,362 B2* | 5/2015 | Fukawatase | ........ | B60R 21/2338 280/728.2 |
| 9,415,740 B2* | 8/2016 | Motomochi | .......... | B60R 21/215 |
| 2002/0089155 A1* | 7/2002 | Tajima | .................. | B60R 21/201 280/732 |
| 2006/0279073 A1* | 12/2006 | Hotta | .................... | B60R 21/206 280/730.1 |
| 2009/0045607 A1* | 2/2009 | Fukuyama | ............ | B60R 21/217 280/728.2 |
| 2010/0244416 A1* | 9/2010 | Mitsuo | ................ | B60R 21/2032 280/731 |
| 2013/0001930 A1* | 1/2013 | Yamada | ............... | B60R 21/2176 280/728.2 |
| 2016/0214563 A1* | 7/2016 | Kunitake | ............... | B60R 21/201 |

FOREIGN PATENT DOCUMENTS

| | | |
|---|---|---|
| GB | 2 391 520 A | 2/2004 |
| JP | H09-2182 A | 1/1997 |
| JP | 2011-057165 A | 3/2011 |

* cited by examiner

AIR BAG CASE

CROSS-REFERENCE TO RELATED APPLICATION(S)

This application is based upon and claims the benefit of priority from Japanese Patent Application No. 2015-044946, filed on Mar. 6, 2015, the entire contents of which are incorporated herein by reference.

BACKGROUND

1. Field of the Invention

The prevent invention relates to a substantially box-shaped air bag case having a bottom wall portion and a side wall portion which rises from an outer circumferential edge of the bottom wall portion into a substantially cylindrical shape and configured not only to accommodate a folded air bag but also to allow the air bag to project from an upper opening portion thereof when the air bag is inflated.

2. Description of the Related Art

Some of conventional air bag cases have a configuration in which in a single metallic sheet material, a side wall configuring portion which configures a side wall portion is bent so as to rise from an outer circumferential edge of a bottom wall configuring portion which configures a bottom wall portion and a plurality of joining piece portions provided on the side wall configuring portion are superposed on corresponding joined portions so that the joining piece portions and the joined portions are crimped together to thereby maintain the rising shape of the side wall portion from the bottom wall portion (refer, for example, to JP-A-2011-57165).

In such a conventional air bag case, however, in the side wall configuring portion, the joining piece portions extend from an edge portion of the side wall configuring portion which lies on a side facing the other adjacent side wall configuring portion towards the other side wall configuring portion and are disposed so as to be substantially at right angles to the bottom wall portion. Namely, in this conventional air bag case, the direction in which the joining piece portions are superposed on the joined portions to be crimped together intersects the direction in which the side wall configuring portion is bent to rise from the bottom wall configuring portion in fabricating the case. Thus, in the fabricating process of the case, the crimping step and the bending step of bending the side wall configuring portion cannot be performed in the same step but have to be performed in separate steps, leaving room for improvement in simplifying the fabricating process of the case.

SUMMARY

The invention has been made to solve the problem above, and an object thereof is to provide an air bag case which can be fabricated simply and easily.

According to an aspect of the invention, there is provided an air bag case, having a substantially box shape, configured to accommodate a folded air bag and configured to allow the air bag to project from an upper opening portion when the air bag is inflated, the air bag case including: a bottom wall portion including a bottom wall configuring portion; a side wall portion including a side wall configuring portion, wherein: the side wall configuring portion is bent so as to rise from an outer circumferential edge of the bottom wall configuring portion of the single metallic sheet material; a plurality of joining piece portions, provided on the side wall configuring portion, are superposed on corresponding joined portions to be crimped together to thereby maintain a rising shape of the side wall portion from the bottom wall portion; and the joining piece portions are disposed substantially parallel to the bottom wall portion together with the joined portions and are superposed on the joined portions so that the joining pieces portions and the joined portions are partially crimped together in a direction which is substantially at right angles to the bottom wall portion.

In the air bag case of the invention, the joining piece portions extending from the side wall configuring portion and the corresponding joined portions are provided substantially parallel to the bottom wall portion. The joining piece portions are superposed on the joined portions, and the joining piece portions and the joined portions are partially crimped together in the direction which is substantially at right angles to the bottom wall portion. Namely, in the air bag case of the invention, the direction in which the joining piece portions are crimped to the joined portions coincides with the direction in which the side wall configuring portion is bent so as to rise from the bottom wall configuring portion, and therefore, the crimping step and the bending step can be performed concurrently. Because of this, the case can be fabricated in the single step, thereby making it possible to reduce the number of fabricating steps and cost involved.

Consequently, the air bag case of the invention can be fabricated simply and easily.

According to the air bag case, the side wall configuring portion may include a plurality of side wall configuring members provided along an outer circumferential edge of the bottom wall configuring portion, the joined portions may be formed as the joining piece portions which are provided on the side wall configuring portion, and the joining piece portions which correspond to each other may be crimped together.

Further, according to the air bag case, the side wall configuring members may be provided so as to extend from four sides along the outer circumferential edge of the bottom wall configuring portion having a substantially rectangular shape, and the joining piece portions which correspond to each other may be provided on respective edge side portions of the side wall configuring members which lie adjacent to each other.

Further, according to the air bag case, the side wall configuring portion may include a plurality of side wall configuring members provided along an outer circumferential edge of the bottom wall configuring portion, and the joined portions may be provided near the outer circumferential edge of the bottom wall configuring portion.

Further, according to the air bag case, the side wall configuring members may include part configuring portions which are provided so as to extend from two facing sides of the outer circumferential edge of the bottom wall configuring portion having a substantially rectangular shape and which configure part of the side wall portions on the other two facing sides of the outer circumferential edge of the bottom wall configuring portion, and the joining piece portions may be provided on the part configuring portions.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, an embodiment of the invention will be described based on the drawings. In this embodiment, the invention will be described by taking an air bag case (hereinafter, referred to simply as a "case") 20 employed in an air bag system M for an occupant in a front passenger seat as an example. It is noted that in this embodiment, front-to-rear, up-to-down and left-to-right directions of the case 20 coincide with front-to-rear, up-to-down and left-to-right directions of a vehicle in which the air bag system M is installed unless otherwise described particularly.

Figure 1:
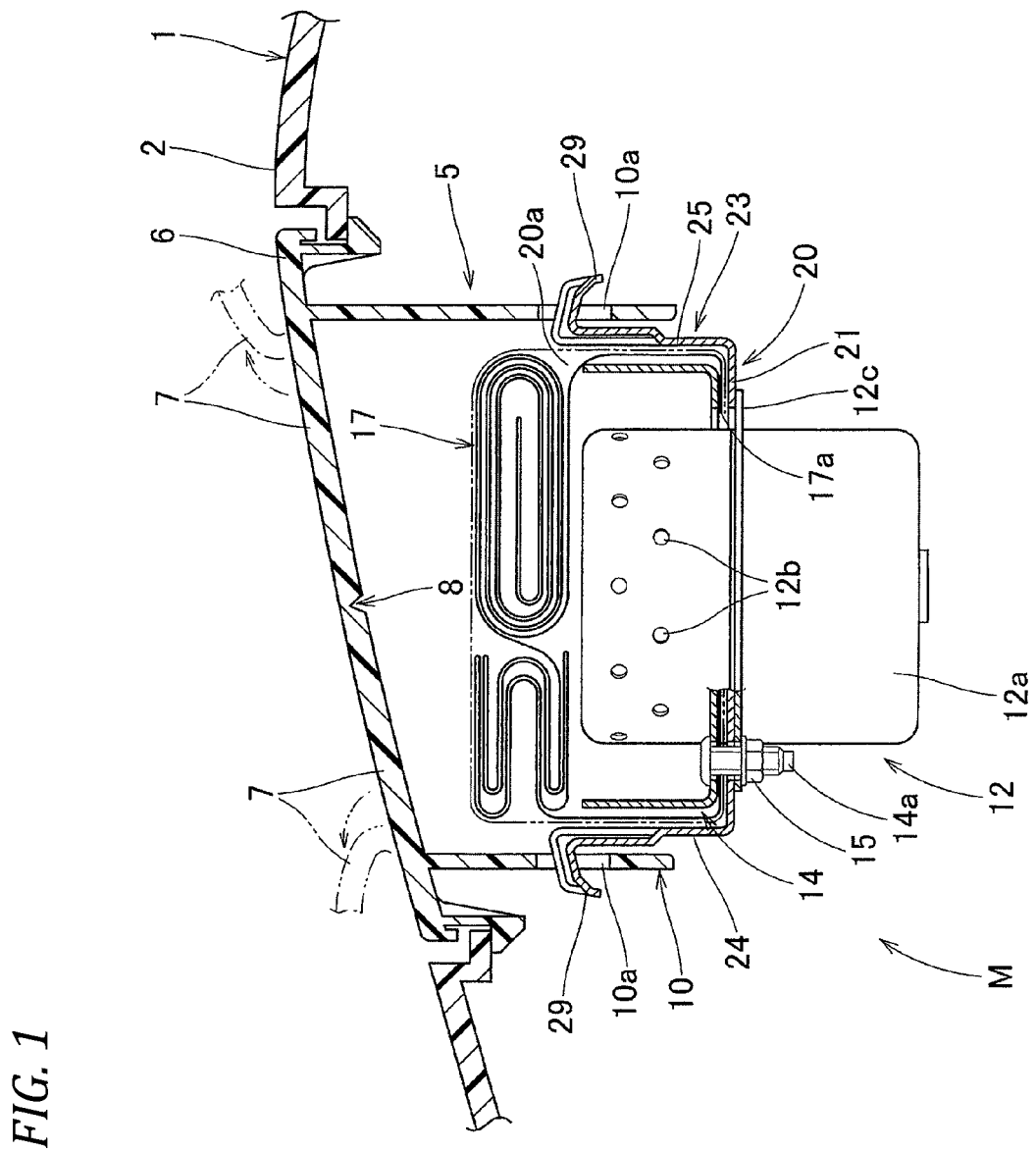
FIG. 1 is a schematic vertical sectional view, taken along a front-to-rear direction, of an air bag system for an occupant in a front passenger seat which employs a case according to a first embodiment of the invention.
Figure 2:
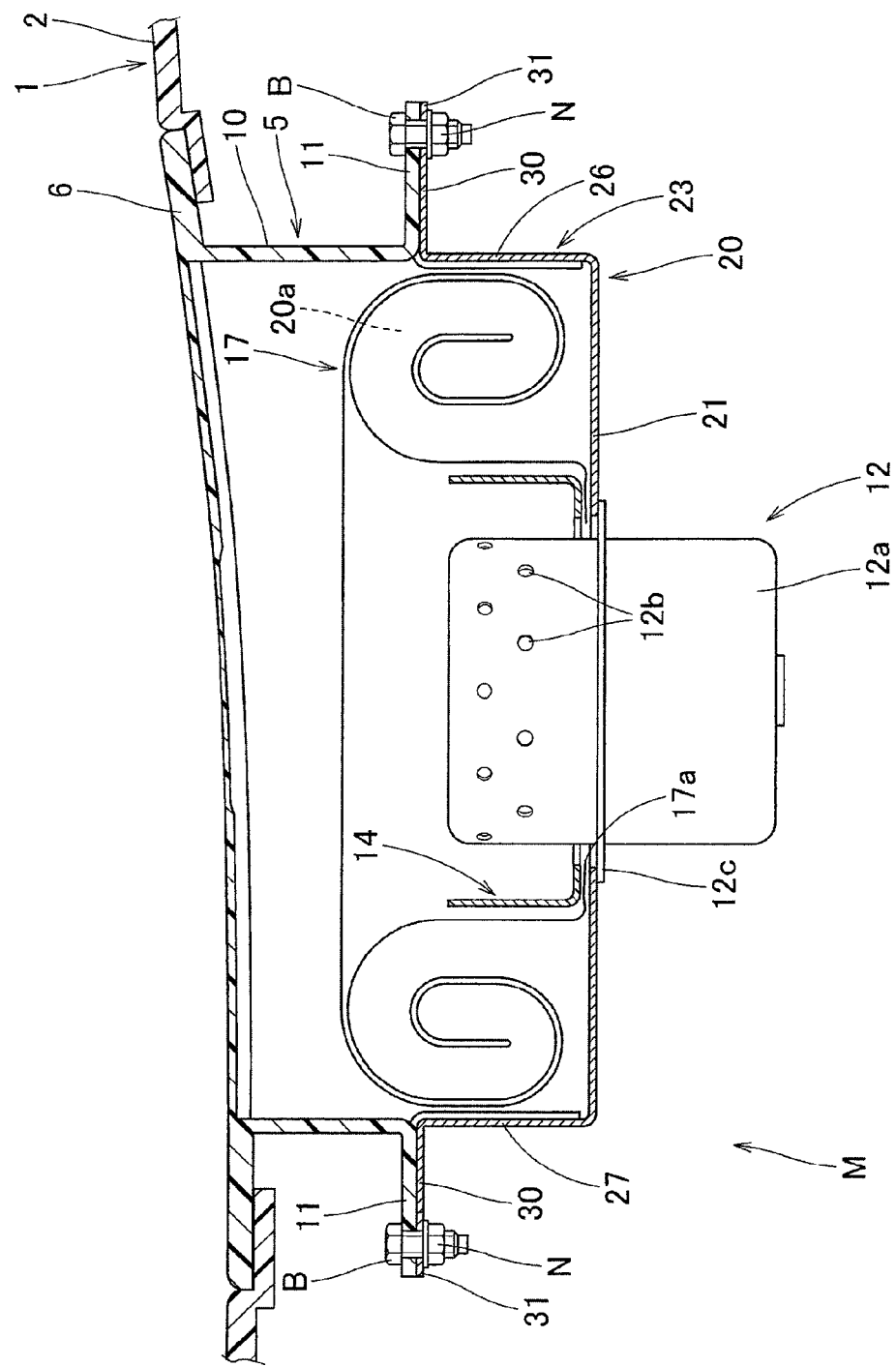
FIG. 2 is a schematic vertical sectional view, taken along a left-to-right direction, of the air bag system for an occupant in a front passenger seat shown in FIG. 1.

The air bag system M for an occupant in a front passenger seat is disposed inside of an upper surface 2 of an instrument panel 1 at the front of the front passenger seat in a vehicle, as shown in FIGS. 1 and 2. The front passenger seat occupant air bag system M includes a folded air bag 17, an inflator 12 for supplying an inflation gas into the air bag 17, the case 20 of the first embodiment which accommodates and holds the air bag 17 and the inflator 12, a retainer 14 for attaching the air bag 17 and the inflator 12 to the case 20, and an air bag cover 5 which covers the folded air bag 17.

In the case of this embodiment, the air bag cover 5 is formed separately from the instrument panel 1 which is formed from a synthetic resin and is disposed in an opening in the instrument panel 1. The air bag cover 5 is formed from a synthetic resin such as a polyolefin-based thermoplastic elastomer and includes a ceiling wall portion 6 configured to close an opening portion 20a, which will be described later, of the case 20 and a substantially quadrangular prism-like circumferential wall portion 10 which extends downwards from a circumferential edge of the ceiling wall portion 6.

Two door portions 7, 7 are provided in an area of the ceiling wall portion 6 which is surrounded by the circumferential wall portion 10, and the door portions 7, 7 are forced to open when the air bag 17 is deployed and inflated. The door portions 7, 7 are provided parallel in the front-to-rear direction, and a rupture-intended portion 8, having an H-shape when viewed from thereabove, is disposed on the circumference of the door portions 7, 7. Thus, when the air bag 17 is deployed and inflated, the door portions 7, 7 are pressed by the air bag 17, which is being inflated, to thereby open to the front and rear while rupturing the rupture-intended portion 8.

The circumferential wall portion 10 is disposed so as to cover an outer circumferential side of a side wall portion 23 of the case 20. Locking hole portions 10a are formed in the circumferential wall portion 10 at a portion which covers a front side and a portion which covers a rear side of the side wall portion 23, so that locking claw portions 29, which will be described later, of the case 20 can be locked in the locking hole portions 10a at circumferential edges thereof. Attaching pieces 11 are formed on the circumferential wall portion 10 at a distal end side (a lower end side) of a portion which covers a left-hand side of the side wall portion 23 and at a distal end side (a lower end side) of a portion which covers a right-hand side of the side wall portion 23 so as to project transversely outwards. The attaching pieces 11 are brought individually into abutment with attaching piece portions 31 which extend individually from flange portions 30, which will be described later, of the case 20 so as to be attached to the attaching piece portions 31.

The inflator 12 includes a substantially cylindrical main body portion 12a having a plurality of gas outlet ports 12b and a flange portion 12c at which the inflator 12 is attached to the case 20, as shown in FIGS. 1 and 2.

The air bag 17 is formed into a bag shape having such flexibility that the air bag 17 can be inflated when an inflation gas is allowed to flow into an interior thereof. The air bag 17 is folded to be accommodated within the case 20 and is designed to protect an occupant seated in a front passenger seat when the air bag 17 is inflated completely. The air bag 17 has a gas inlet port 17a. This inlet port 17a is opened into a substantially circular opening, which enables the inflation gas to flow into the interior of the air bag 17 therethrough. A circumferential edge of the inlet port 17a is attached to the bottom wall portion 21 of the case 20.

Figure 3:
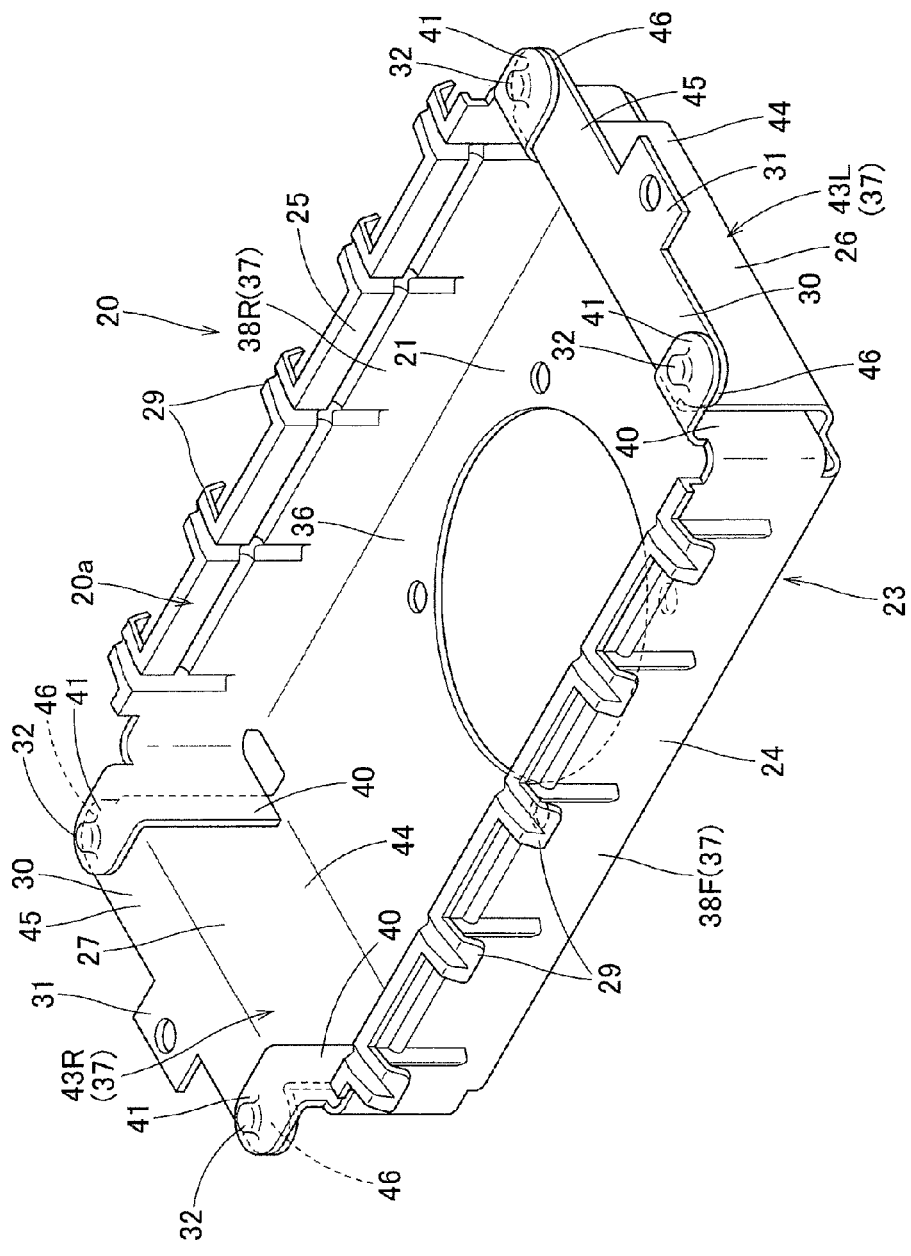
FIG. 3 is a schematic perspective view of the case according to the first embodiment.

The case 20 is formed of a metallic sheet material. The case 20 can accommodate the folded air bag 17 therein and allows the air bag 17 to project from the upper opening portion 20a when the air bag 17 is inflated. The case 20 has a bottom wall portion 21 and the side wall portion 23 which rises from an outer circumferential edge of the bottom wall portion 21 into a substantially cylindrical shape and is formed into a substantially boxed shape, as shown in FIGS. 1 to 3.

In the case of this embodiment, the bottom wall portion 21 has a substantially rectangular plate shape which is longer in the left-to-right direction than in the front-to-rear direction. The bottom wall portion 21 has an insertion hole (whose illustration and reference numeral are omitted here) formed in a center thereof and attaching holes (whose illustration and reference numeral are omitted here) formed around the insertion hole. The main body portion 12a of the inflator 12 can be inserted through the insertion hole, and bolts 14a of the retainer 14 can be inserted through the attaching holes. In the case of this embodiment, the bolts 14a of the retainer 14 which is disposed inside the air bag 17 are passed through a circumferential edge of a gas inlet port 17a of the air bag 17 and are then inserted through the attaching holes in the bottom wall portion 21 of the case 20. Then, the bolts 14a are passed through the flange portion 12c of the inflator 12 and nuts 15 are tightened on the bolts 14a, whereby the air bag 17 and the inflator 12 are attached to the bottom wall portion 21 of the case 20.

In the side wall portion 23, the plurality of locking claw portions 29 are formed along the left-to-rear direction at upper ends of a front wall portion 24 and a rear wall portion 25 which are disposed to face each other in the front-to-rear direction so as to project outwards, and the locking claw portions 29 lock the circumferential wall portion 10 of the air bag cover 5. The locking claw portions 29 are formed integrally with the case 20, so that the locking claw portions 29 are inserted through the locking hole portions 10a formed in the circumferential wall portion 10 to be locked at the circumferential edges of the locking hole portions 10a as shown in FIG. 1. In the side wall portion 23, the flange portions 30 are formed individually on upper end sides of a left wall portion 26 and a right wall portion 27 which are disposed so as to face each other in the left-to-right direction. The flange portions 30 extend the full length of the left and right wall portions 26, 27 substantially along the bottom wall portion 21 in the front-to-rear direction while projecting outwards to the left and right. The attaching piece portions 31 are formed at portions on transversely outer edges of the flange portions 30 so as to project outwards. Then, the attaching pieces 11 formed on the air bag cover 5 are superposed on the attaching piece portions 31 from above, and the attaching pieces 11 and the attaching piece portions 31 are attached together with bolts B and nuts N which function as attaching devices (refer to FIG. 2). In this embodiment, the side wall portion 23 is made into a substantially quadrangular prism-like shape by connecting a front wall configuring portion 38F which configures the front wall portion 24, a rear wall configuring portion 38R which configures the rear wall portion 25, a left wall configuring portion 43L which configures the left wall portion 26 and a right wall configuring portion 43R which configures the right wall portion 27 together by crimp portions 32 which are formed at respective front and rear end sides of the flange portions 30 (or near four corners of the side wall portion 23).

Figure 4:
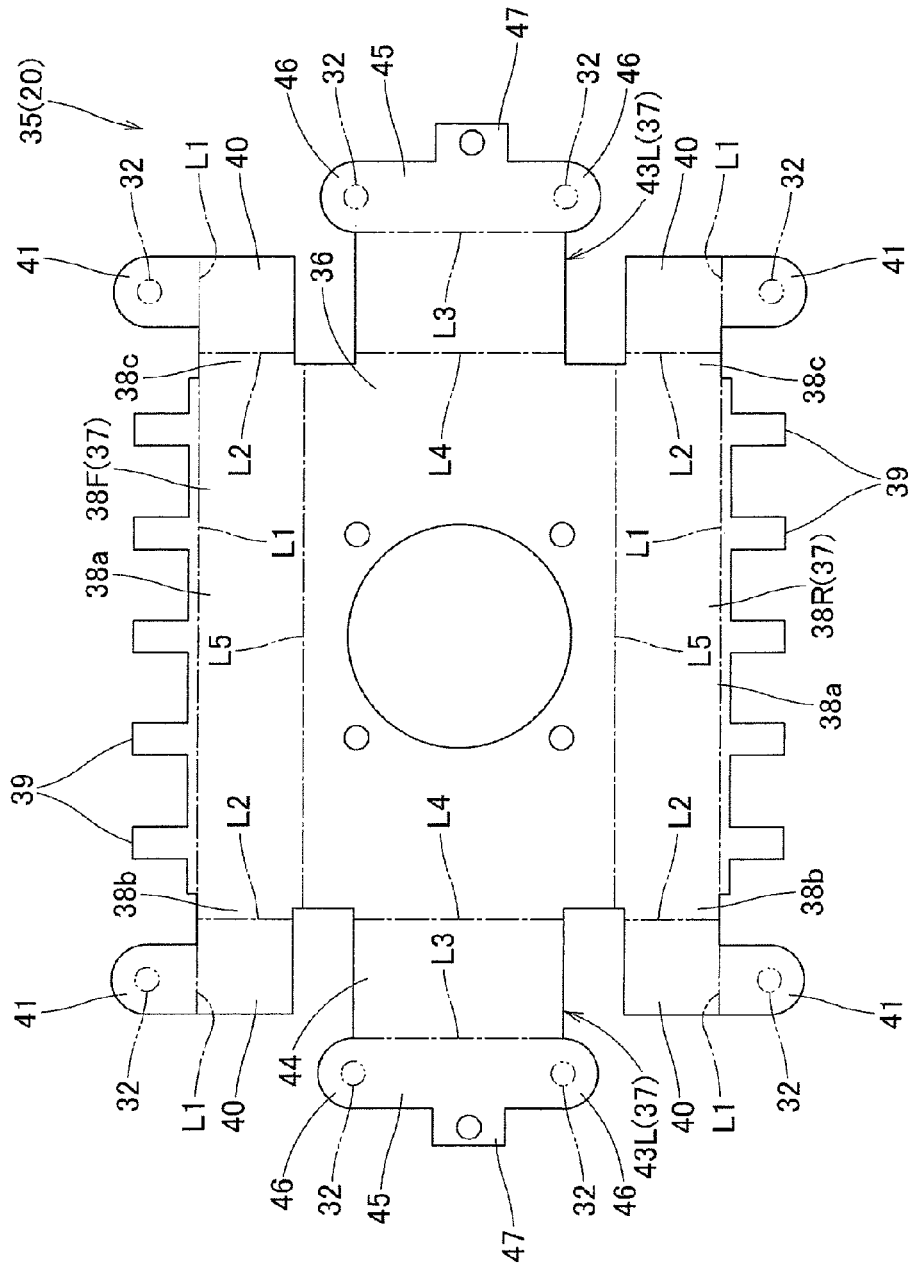
FIG. 4 is a development view in plan of a case material of which the case according to the first embodiment is made.

The case 20 of the first embodiment is formed by punching a case material 35 as shown in FIG. 4 from a metallic sheet material and bending the case material 35 at portions where folds L1 to L5 are provided.

As shown in FIG. 4, the case material 35 includes a substantially rectangular bottom wall configuring portion 36 which configures the bottom wall portion 21 and four side wall configuring portions (side wall configuring members) 37 which extend individually from four sides along an outer circumferential edge of the bottom wall configuring portion 36. The side wall configuring portions 37 are the front wall configuring portion 38F which configures the front wall portion 24, the rear wall configuring portion 38R which configures the rear wall portion 25, the left wall configuring portion 43L which configures the left wall portion 26 and the right wall configuring portion 43R which configures the right wall portion 27 of the side wall portion 23. In the case of this embodiment, the front wall configuring portion 38F and the rear wall configuring portion 38R are symmetrical in shape with each other in relation to the front-to-rear direction, and the left wall configuring portion 43L and the right wall configuring portion 43R are symmetrical in shape with each other in relation to the left-to-right direction.

The front wall configuring portion 38F and the rear wall configuring portion 38R are substantially rectangular, and their width in the left-to-right direction substantially coincides with a width of the bottom wall configuring portion 36 in the left-to-right direction. Claw configuring portions 39 which configure the locking claw portions 29 are formed on distal edge portions (upper edges 38a of the case 20 when the case 20 is fabricated) of the front wall configuring portion 38F and the rear wall configuring portion 38R which lie far away from the bottom wall configuring portion 36 of the case material 35 which is deployed flat so as to project therefrom. In addition, extension portions 40 are formed on edges (a left edge 38b and a right edge 38c) of either of the front wall configuring portion 38F and the rear wall configuring portion 38R which face the left wall configuring portion 43L and the right wall configuring portion 43R. The extension portions 40 extend transversely outwards from the left and right edges 38b, 38c in the case material 35 which is deployed flat and extends along the left wall configuring portion 43L and the right wall configuring portion 43R (inwards in the front-to-rear direction) when the case 20 is fabricated. The extension portions 40 are formed to extend a full vertical length of the front wall configuring portion 38F and the rear wall configuring portion 38R (the side wall portion 23) and each include a projecting portion 41 which projects further upwards than the upper edges 38a of the front wall configuring portion 38F and the rear wall configuring portion 38R. The projecting portion 41 configures a joining piece portion which is superposed on an end portion 46 of a flange configuring portion 45 of either of the left wall configuring portion 43L and the right wall configuring portion 43R which lie adjacent thereto and is then joined to the end portion 46, as shown in FIG. 3.

The left wall configuring portion 43L and the right wall configuring portion 43R include substantially rectangular main body portions 44 respectively configuring the left wall portion 26 and the right wall portion 27 and the flange configuring portions 45 which extend from upper edge sides of the main body portions 44 to form the flange portions 30. In the case of this embodiment, a front-to-rear direction width dimension of the main body portion 44 is set slightly smaller than a front-to-rear direction width dimension of the bottom wall configuring portion 36. The flange configuring portions 45 are formed to extend along the full length of the main body portions 44 in the front-to-rear direction, and the front and rear end portions 46 of the flange configuring portions 45 configure joining piece portions (joined portions) which are superposed on the projecting portions 41 of the extension portions 40 which are formed at the left edges 38b and the right edges 38c of the front wall configuring portion 38F and the rear wall configuring portion 38R which lie adjacent thereto when the case 20 is fabricated and are then joined to the projecting portions 41. Attaching piece configuring portions 47 which configure the attaching piece portions 31 are formed on the flange configuring portions 45 so as to project therefrom.

Although a detailed illustration is omitted, the case 20 of the first embodiment will be fabricated as follows. Firstly, in the case material 35, irregularities are given to the claw configuring portions 39 to form the locking claw portions 29. Folds are formed at the portions of the folds L1, and the locking claw portions 29 are bent towards the front wall configuring portion 38F and the rear wall configuring portion 38R. Additionally, the projecting portions 41 are bent towards the extension portions 40. Next, folds are formed at the portion of the folds L2, and the extensions 40 are bent so as to rise from the front wall configuring portion 38F and the rear wall configuring portion 38R. At the same time, folds are formed at the portions of the folds L3, and the flange configuring portions 45 are bent towards the main body portions 44. Thereafter, folds are formed at the portions of the folds L4, and the left wall configuring portion 43L and the right wall configuring portion 43R are bent so as to rise from the bottom wall configuring portion 36. Further, folds are formed at the portions of folds L5, and the front wall configuring portion 38F and the rear wall configuring portion 38R are bent so as to rise from the bottom wall configuring portion 36. As this occurs, the extension portions 40 are disposed so as to cover inner sides of the left wall configuring portion 43L and the right wall configuring portion 43R, and the projecting portions 41 of the extension portions 40 are disposed so as to be superposed on upper sides of the end portions 46 of the flange configuring portions 45 which lie adjacent thereto. Then, the projecting portions 41 and the flange portions 30 (the flange configuring portions 45) both become substantially parallel to the bottom wall portion 21 (refer to Section A of FIG. 5). Thereafter, the projecting portions 41 configuring the joining pieces respectively adjacent each other and the end portions 46 of the flange configuring portions 45 which lie adjacent to each other are partially crimped together in the direction (the up-to-down direction) which is substantially at right angles to the bottom wall portion 21 by TOX caulking to thereby form the crimp portions 32 as shown in Section B of FIG. 5. Thus, the case 20 can be fabricated. Then, in the case 20 of the first embodiment, the front wall configuring portion 38F which configures the side wall configuring portion 37, the projecting portions 41 which are provided at the left edge 38b side and the right edge side 38c of the rear wall configuring portion 38R as the joining piece portions, the adjacent left wall configuring portion 43L, and the end portions 46 at the front and rear edge portion sides of the flange configuring portion 45 provided on the right wall configuring portion 43R are superposed on one another to be crimped together, whereby as shown in FIG. 3, the crimp portions 32 are provided near the four corners of the side wall portion 23, allowing the case 20 to maintain the rising shape of the side wall portion 23 from the bottom wall portion 21.

Then, the air bag 17 which is folded with the retainer 14 accommodated in the interior thereof is accommodated within the case 20 formed in the way described above in such a way that the folded air bag 17 is placed on the bottom wall portion 21. The main body portion 12a of the inflator 12 is then inserted into the case 20 from below the bottom wall portion 21, and the bolts 14a of the retainer 14 which project downwards from the bottom wall portion 21 are inserted through the flange portion 12c of the inflator 12. Thereafter, the nuts 15 are tightened on the bolts 14a which project from the flange portion 12c of the inflator 12, whereby the folded air bag 17 and the inflator 12 can be attached to the case 20. Thereafter, the air bag cover 5 is attached to the case 20, whereby the front passenger seat occupant air bag system M can be built up. This front passenger seat occupant air bag system M is fixed to a body side of the vehicle by making use of a bracket, not shown, which is attached to the case 20 by making use of the bolts 14a of the retainer 14, whereby the front passenger seat occupant air bag system M can be installed in the vehicle.

When the vehicle is involved in a frontal collision after the front passenger seat occupant air bag system M is installed in the vehicle, in case the inflation gas is discharged from the gas outlet ports 12b of the inflator 12, the inflation gas is allowed to flow into the interior of the air bag 17, whereby the air bag 17 is inflated to project greatly from the opening portion 20a in the case 20 which is formed as a result of the door portions 7, 7 of the air bag cover 5 being forced to open by the inflating air bag 17, and the air bag 17 completes the inflation.

Figure 5:
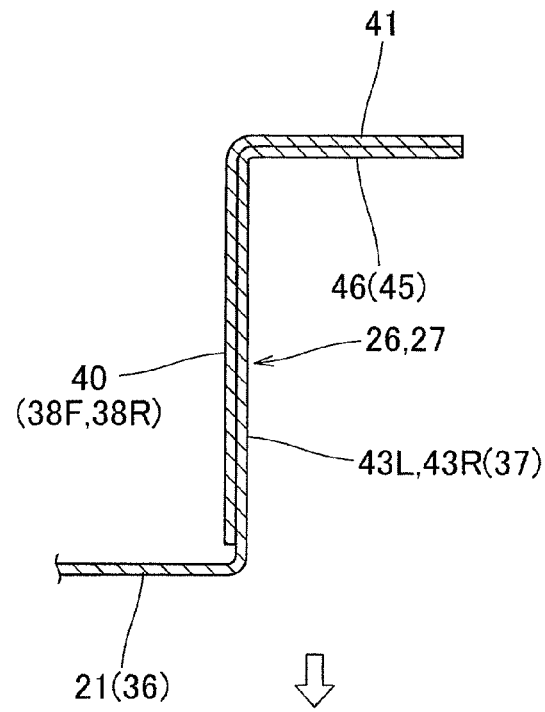
FIG. 5 shows schematic partially enlarged vertical sectional views showing the formation of a crimp portion in the fabricating process of the case according to the first embodiment.
Figure 5:
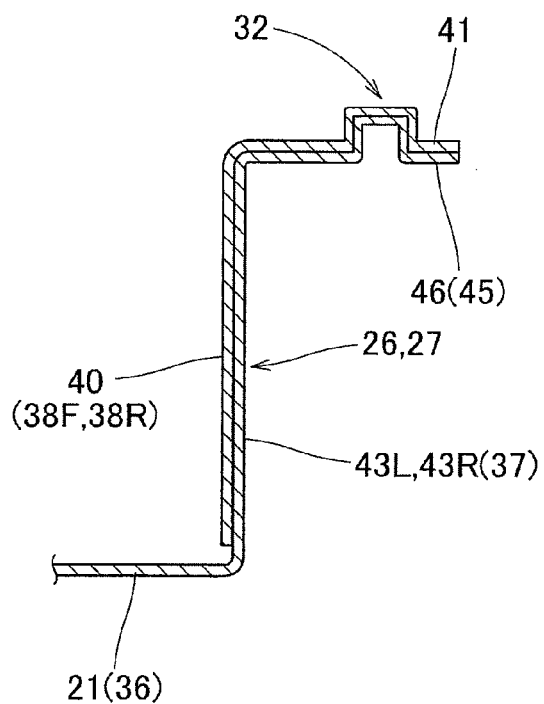

In the case 20 of the first embodiment, the projecting portions 41 which are the joining piece portions extending from the front wall configuring portion 38F and the rear wall configuring portion 38R which are both the side wall configuring portions 37 and the flange portions 30 (the flange configuring portions 45) which are the corresponding to the joined portions (the joining piece portions) are provided substantially parallel to the bottom wall portion 21, and the projecting portions 41 are superposed on the end portions 46 of the flange configuring portions 45 and are then partially crimped together with the end portions 46 in the direction which is substantially at right angles to the bottom wall portion 21. Namely, in the case 20 of the first embodiment, the direction in which the projecting portions 41 are crimped to the end portions 46 coincides with the direction in which the side wall configuring portions 37 are bent so as to rise from the bottom wall configuring portion 36 as shown in FIG. 5. Thus, the crimping step can be performed in the same step as the bending step. In other words, in the case 20 of the first embodiment, the case 20 can be fabricated without removing works from the working line in which the works are worked on by being displaced sequentially in the direction which is at right angles to clamping directions of a press with the clamping directions aligned in the same direction. Because of this, the case 20 can be fabricated in the single step, thereby making it possible to reduce the number of fabricating steps and cost involved.

Consequently, the case 20 of the first embodiment can be fabricated simply and easily.

Figure 6:
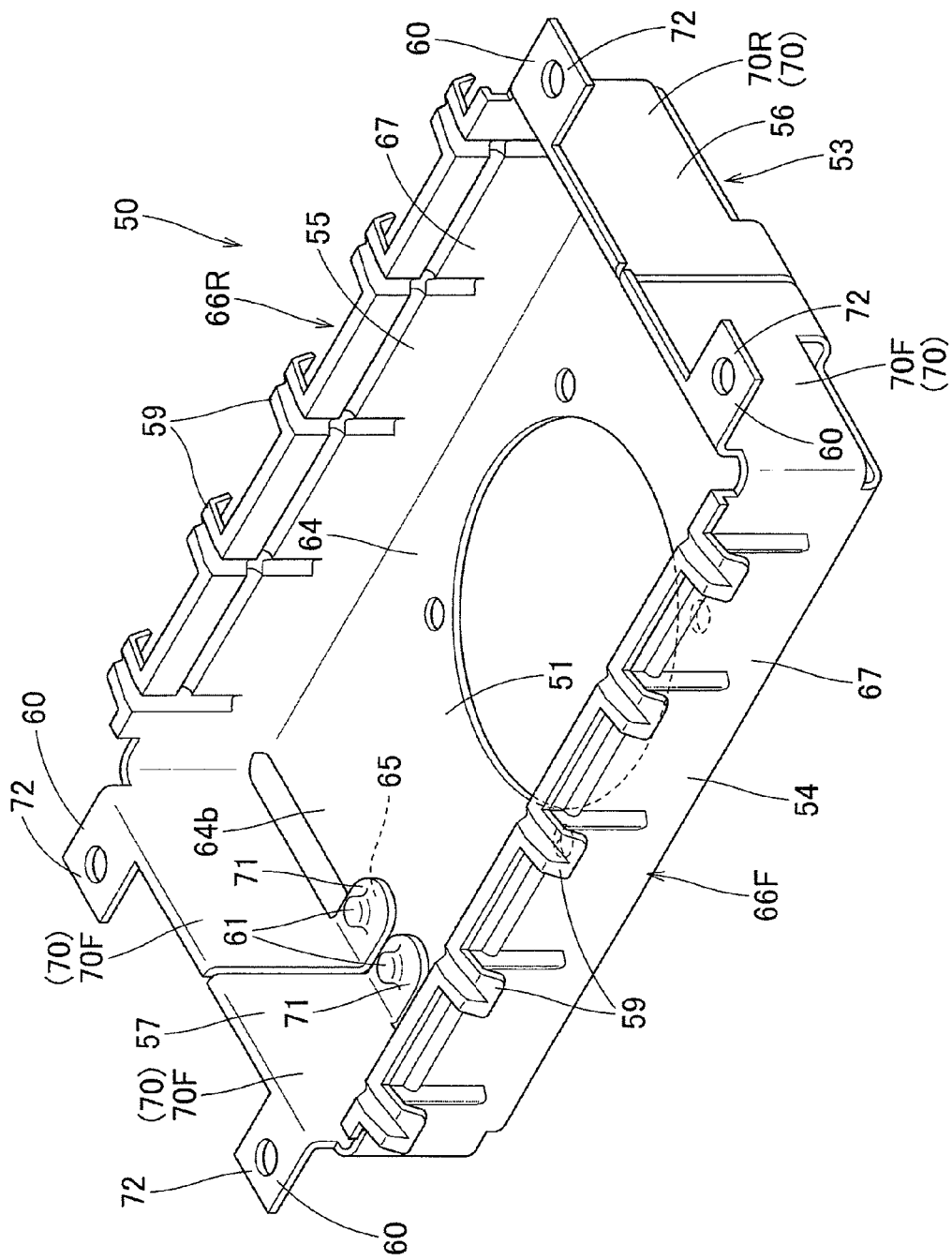
FIG. 6 is a schematic perspective view of a case according to a second embodiment.

Next, a case 50 according to a second embodiment will be described. As the case with the case 20 described above, the case 50 according to a second embodiment has, as shown in FIG. 6, a bottom wall portion 51 and a side wall portion 53 which rises from an outer circumferential edge of the bottom wall portion 51 into a substantially cylindrical shape. The case 50 has a substantially box shape whose width dimension in a left-to-right direction is greater than one in a front-to-rear direction. As with the case 20 described above, locking claw portions 59 are formed at upper ends of a front wall portion 54 and a rear wall portion 55 of the side wall portion 53. In this case 50, attaching piece portions 60 are formed on upper end sides of a left wall portion 56 and a right wall portion 57 of the side wall portion 53 at four locations positioned near front and rear ends thereof. The attaching piece portion 60 extend outwards to the left and right and attaching pieces of an air bag cover, not shown, are attached to the attaching piece portions 60. In the case 50 of the second embodiment, two side wall configuring portions 66F, 66R of a case material 63 which make up the side wall portion 53 each include a main body portion 67 which makes up the front wall portion 54 or the rear wall portion 55 and part configuring portions 70 which are provided so as to extend to protrude outwards to the left and right from the main body portion 67 to thereby configure portions of a left wall portion 56 and a right wall portion 57 (refer to FIG. 7).

The side wall portion 53 is made into a substantially quadrangular prism shape by joining piece portions 71 of the part configuring portions 70 which extend from lower edges 70b of distal end 70a sides thereof to the bottom wall portion 51 by crimp portions 61 as shown in FIG. 6. Then, in the case 50 of the second embodiment, as will be described later, the left wall portion 56 and the right wall portion 57 of the side wall portion 53 are each divided into two in the front-to-rear direction in such a way that the part configuring portions 70 (70F, 70R) of the two side wall configuring portions 66F, 66R are provided end to end in the front-to-rear direction (refer to FIG. 6).

Figure 7:
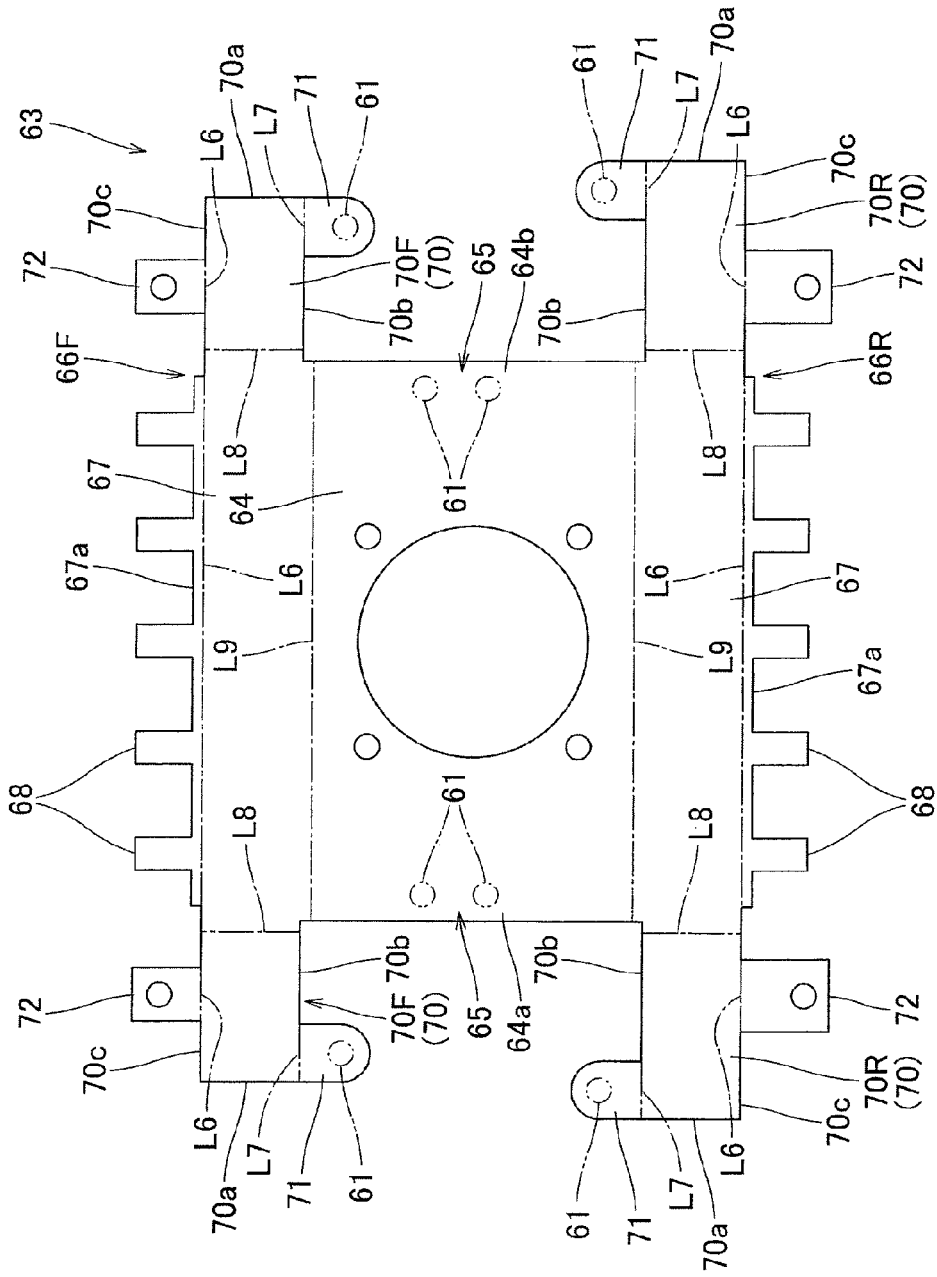
FIG. 7 is a development view in plan of a case material of which the case according to the second embodiment is made.

The case 50 of the second embodiment is formed by punching a case material 63 as shown in FIG. 7 from a metallic sheet material and bending the case material 63 at portions of folds L6 to L9.

As shown in FIG. 7, the case material 63 includes a substantially rectangular bottom wall configuring portion 64 which configures the bottom wall portion 51, the two side wall configuring portions 66F, 66R which extend individually from two facing sides of an outer circumferential edge of the bottom wall configuring portion 64. In the case material 63 of the second embodiment, portions on a left edge 64a and a right edge 64b of the bottom wall configuring portion 64 which each lie near a center in the front-to-rear direction configure joined portions 65 to which the joining piece portions 71 formed on the side wall configuring portions 66F, 66R are joined (refer to FIG. 7).

The side wall configuring portions 66F, 66R configure the side wall portion 53 and are formed substantially symmetrical in shape with each other in the front-to-rear direction. In this embodiment, the side wall configuring portions 66F, 66R each include the main body portion 67 which is formed so as to extend from a front edge side or a rear edge side of the bottom wall configuring portion 64 (the bottom wall portion 51) which face each other in the front-to-rear direction and the part configuring portions 70 (70F, 70R) which are provided to extend from left and right edge sides of the main body portion 67 so as to project outwards to the left and right. In the case of this embodiment, a width dimension of the part configuring portions 70R of the side wall configuring portion 66R which configures the rear portion of the side wall portion 53 are set greater than that of the part configuring portions 70F of the side wall configuring portion 66F which configures the front portion, whereby the overall width dimension of the side wall configuring portion 66R in the left-to-right direction is set greater than that of the side wall configuring portion 66F (refer to FIG. 7).

The main body portion 67 configures the front wall portion 54 or the rear wall portion 55 of the side wall portion 53, and a width dimension of the main body portion 67 in the left-to-right direction substantially coincides with a width dimension of the bottom wall configuring portion 64 in the left-to-right direction. In each main body portion 67, claw configuring portions 68 which configure the locking claw portions 59 are disposed at distal edge portions (upper edges 67a when the case 50 is formed) of the case material 63 which is deployed flat which lie far away from the bottom wall configuring portion 64 so as to project therefrom.

The part configuring portions 70 (70F, 70R) configure part of the left side wall portion 56 or the right wall portion 57 and are formed so as to extend substantially a full vertical length of the main body portion 67 while projecting outwards to the left and right from left and right edge sides of the main body portion 67. A projecting amount of the part configuring portions 70 from the main body portion 67 (a width dimension of the part configuring portions 70 in the left-to-right direction of the case material 63 which is deployed flat) is set to on the order of one half a width dimension of the bottom wall portion 51 (the bottom wall configuring portion 64) in the front-to-rear direction. To describe this in detail, as has been described above, the width dimension of the front part configuring portions 70F in the left-to-right direction is set smaller than the width dimension of the rear part configuring portions 70R in the left-to-right direction. The width dimensions of the part configuring portions 70F, 70R in the left-to-right direction (the width dimension of the case 50 in the front-to-rear direction when the case 50 is formed) are set so that almost no gap is formed between the distal ends 70a, 70a of the part configuring portions 70F, 70R in forming the left wall portion 56 and the right wall portion 57 by the part configuring portions 70F, 70R in such a way that the distal ends 70a butt each other. In the case of this embodiment, the part configuring portions 70 (70F, 70R) configure nearly front half areas and rear half areas of the left wall portion 56 and the right wall portion 57. The joining piece portions 71 which are joined to the joined portions 65 which are provided on the left edge 64a side and the right edge 64b side of the bottom wall configuring portion 64 are formed on the lower edges 70b of the distal end 70a sides of the part configuring portions 70 so as to project downwards therefrom. In addition, attaching piece configuring portions 72 which configure the attaching piece portions 60 are formed on upper edge 70c sides of the part configuring portions 70 at portions which lie near the main body portion 67 so as to project upwards therefrom.

Figure 8:
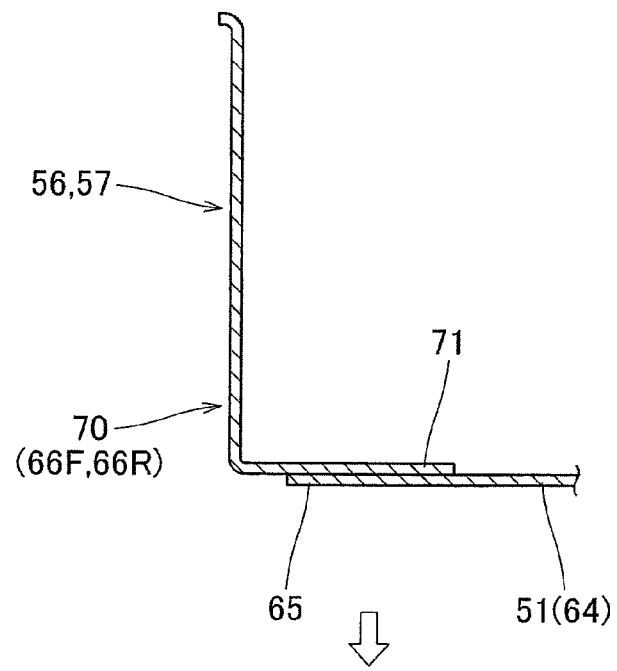
FIG. 8 shows schematic partially enlarged vertical sectional views showing the formation of a crimp portion in the fabricating process of the case according to the second embodiment.
Figure 8:
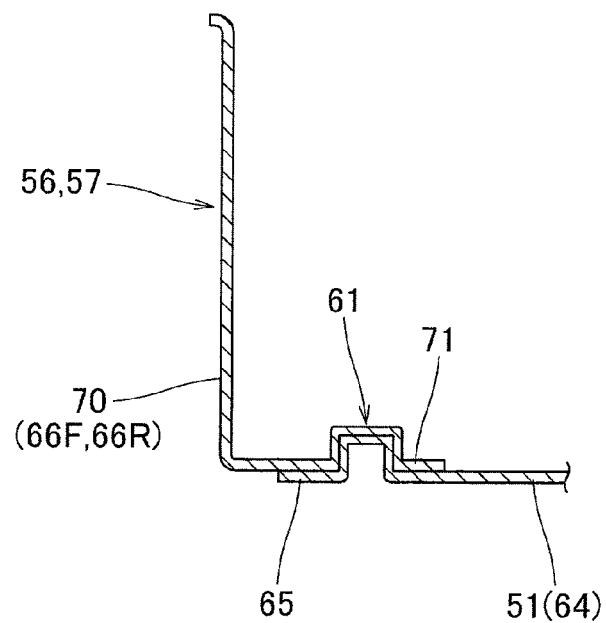

Although a detailed illustration is omitted, the case 50 of the second embodiment will be fabricated as follows. Firstly, in the case material 63, irregularities are given to the claw configuring portions 68 to form the locking claw portions 59. Folds are formed at the portions of the folds L6, and the locking claw portions 59 are bent towards the main body portions 67, and the attaching piece configuring portions 72 are bent towards the part configuring portions 70. Next, folds are formed at the portion of the folds L7, and the joining piece portions 71 are bent towards the part configuring portions 70. Thereafter, folds are formed at the portions of the folds L8, and the part configuring portions 70 are bent so as to rise from the main body portions 67. Next, folds are formed at the portions of the folds 9, and the side wall configuring portions 66F, 66R are bent so as to rise from the bottom wall configuring portion 64. As this occurs, the joining piece portions 71 are superposed on the portions at the left edge 64a side and the right edge 64b side of the bottom wall configuring portion 64 and become substantially parallel to the bottom wall configuring portion 64 (the bottom wall portion 51) (refer to Section A of FIG. 8). Then, as shown in Section B of FIG. 8, the joining piece portions 71 and joined portions 65 which are configured by the portions of the bottom wall portion 51 (the bottom wall configuring portion 64) are partially crimped together in the direction (the up-to-down direction) which is substantially at right angles to the bottom wall portion 51 by TOX caulking to thereby form the crimp portions 61. Thus, the case 50 can be fabricated. Then, in the case 50 of the second embodiment, the joining piece portions 71 which are provided at the distal end 70a sides of the part configuring portions 70 of the side wall configuring portions 66F, 66R are superposed on the joined portions 65 which are configured by the portions at the left edge side and the right edge side of the bottom wall portion 51 and are then crimped together therewith, whereby the crimp portions 61 are provided at the lower end sides of the left wall portion 56 and the right wall portion 57 of the side wall portion 53 at the lower portions lying near the centers in the front-to-rear direction, whereby the case 50 is made to maintain the rising configuration of the side wall portion 53 from the bottom wall portion 51.

In the case 50 of the second embodiment, too, the joining piece portions 71 which extend from the side wall configuring portions 66F, 66R are disposed substantially parallel to the bottom wall portion 51 and are superposed on the corresponding joined portions 65 (the portions at the left and right edge sides of the bottom wall portion 51). Then, the joining piece portions 71 and the joined portions 65 are partially crimped together in the direction which is substantially at right angles to the bottom wall portion 51. Namely, in the case 50 of the second embodiment, too, the direction in which the joining pieces portion 71 are crimped to the joined portions 65 coincides with the direction in which the side wall configuring portions 66F, 66R are bent so as to rise from the bottom wall configuring portion 64, and therefore, the crimping step and the bending step can be performed in the same step concurrently. Because of this, the case 50 can be fabricated in the single step, thereby making it possible to reduce the number of fabricating steps and cost involved.

Consequently, the case 50 of the second embodiment can be fabricated simply and easily.

Figure 9:
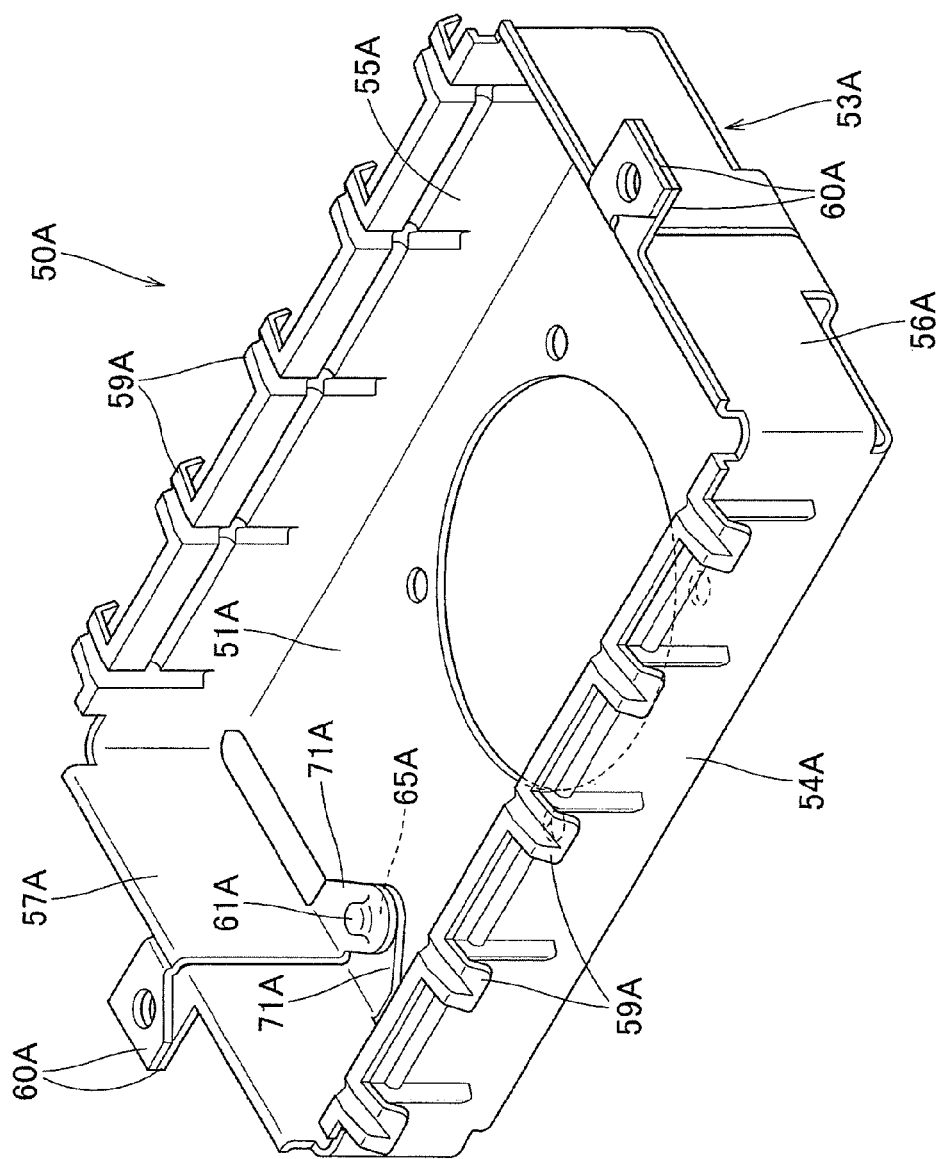
FIG. 9 is a schematic perspective view of a case according to a third embodiment
Figure 10:
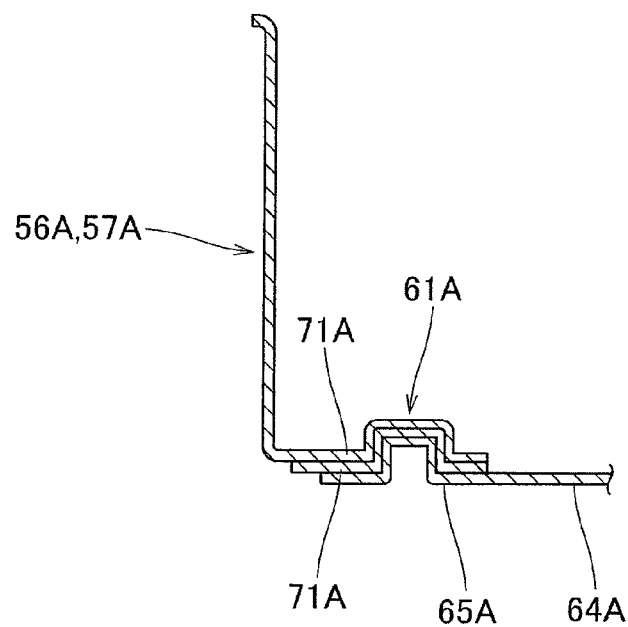
FIG. 10 shows a schematic partially enlarged vertical sectional view showing a portion where a crimp portion is formed in the case shown in FIG. 9.

FIGS. 9 and 10 show a case 50A of a third embodiment which is a modified example made to the case 50 of the second embodiment. As shown in FIGS. 9 and 10, in this configuration, joining piece portions 71A, 71A which extend from part configuring portions 70A, 70A which lie adjacent to each other are superposed on each other in an up-to-down direction and are then crimped together to a joined portion 65A on a bottom wall portion 51A at a single location. Thus, a crimp portion 61A is disposed one by one respectively on a left edge side and a right edge side of the bottom wall portion 51A. In addition, in this case 50A, the position of attaching piece portions 60A to which an air bag cover, not shown, is attached also differs from that of the case 50. The attaching piece portions 60A project outwards to the left and right from near distal ends of the part configuring portions 70A (near centers of a left wall portion 56A and a right wall portion 57A in a front-to-rear direction) and are superposed on each other in the up-to-down direction. Then, the air bag cover, not shown, is attached to the attaching piece portions 60A. The case 50A is identical with the case 50 in the other configurations than these configurations described above. Thus, "A" is appended to like reference numerals to those of the case 50, and the detailed description thereof will be omitted here. In the case 50A configured as described above, compared with the case 50 of the second embodiment, the number of locations where to dispose the crimp portions 61A can be reduced, and therefore, the fabrication costs can be reduced more in the case 50A than in the case 50 of the second embodiment.

Figure 11:
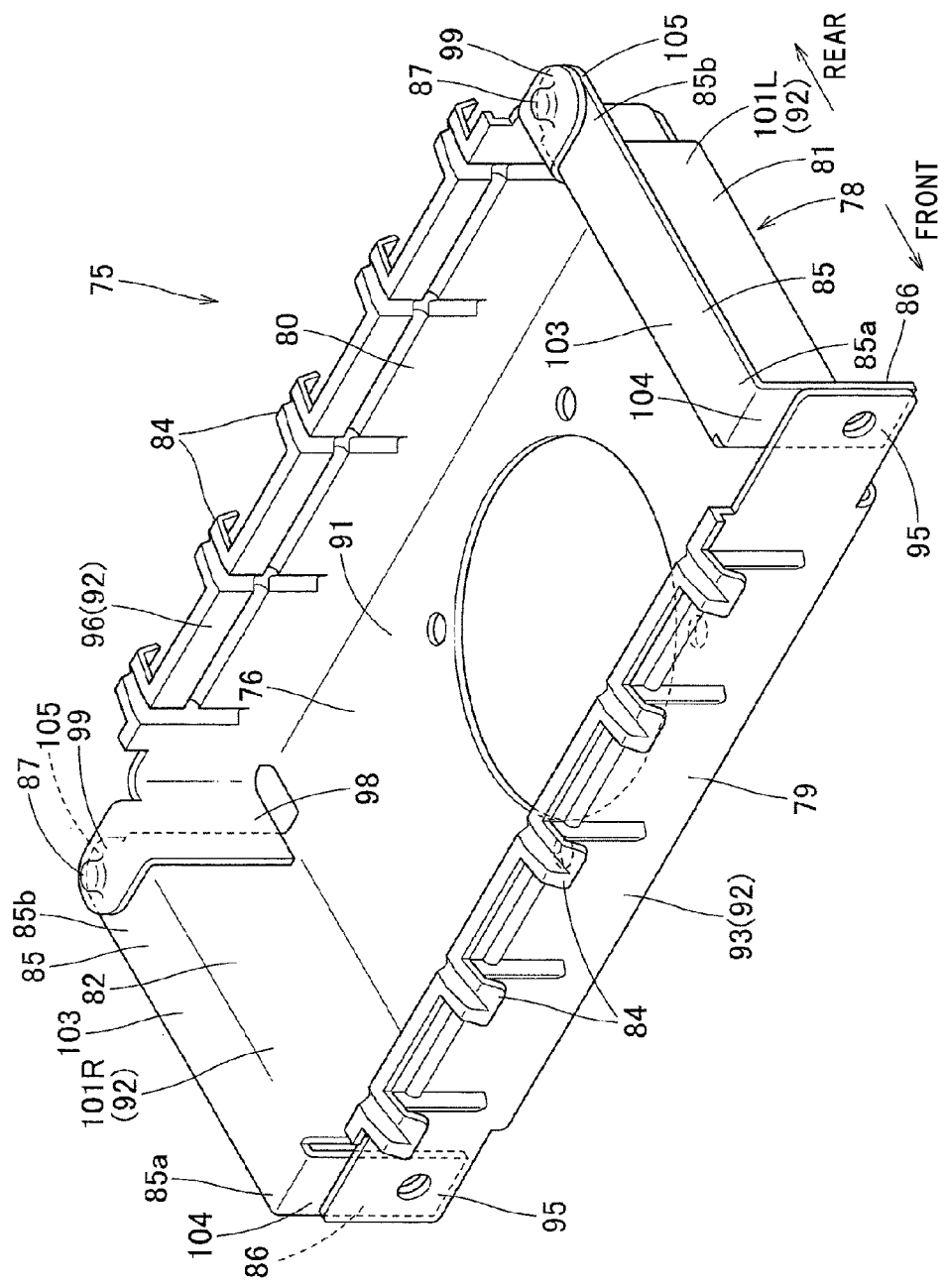
FIG. 11 is a schematic perspective view of a case according to a fourth embodiment.

In the cases 20, 50, 50A of the first to third embodiments, the rising configurations of the side wall portions 23, 53, 53A from the bottom wall portions 21, 51, 51A are described as being maintained only by the crimp portions 32, 61, 61A. However, as in a case 75 of a fourth embodiment shown in FIG. 11, a configuration may be adopted in which a rising configuration of a side wall portion 78 from a bottom wall portion 76 is maintained by making use of attaching piece portions 86 to which an air bag cover 5B is attached in addition to crimp portions 87.

Figure 12:
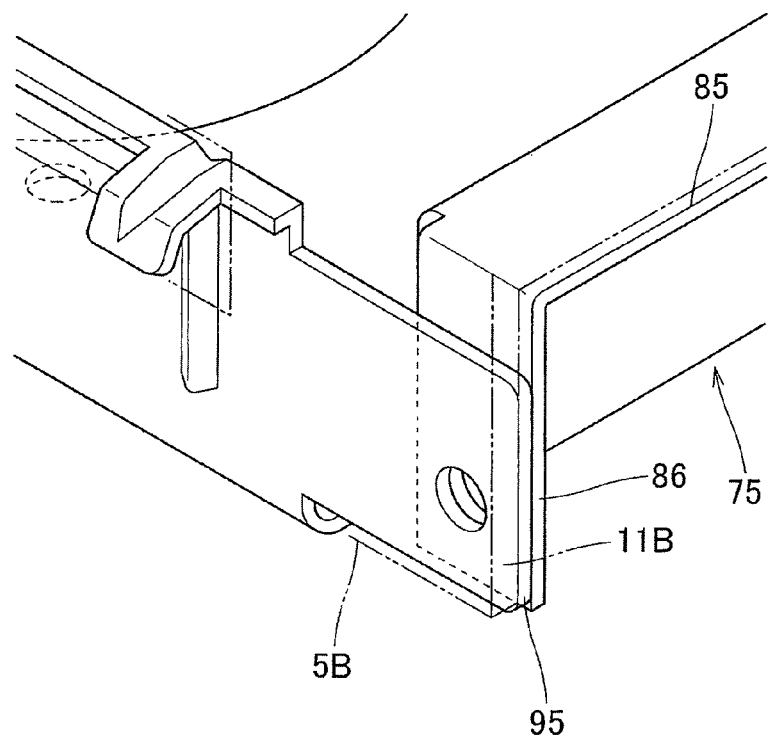
FIG. 12 is a partially enlarged perspective view showing a portion where a mounting piece portion is formed in the case shown in FIG. 11.
Figure 13:
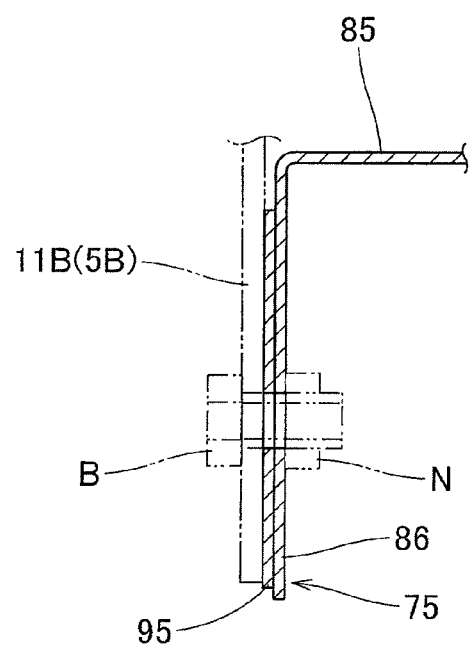
FIG. 13 is a partially enlarged sectional view showing the portion where the mounting piece portion is formed in the case shown in FIG. 11.

As in the case with the cases 20, 50, 50A described above, as shown in FIG. 11, the case 75 of the fourth embodiment has a bottom wall portion 76 and a side wall portion 78 which rises from a outer circumferential edge of the bottom wall portion 76 into a substantially cylindrical shape and has a substantially box shape whose width dimension in a left-to-right direction is greater than a width dimension in a front-to-rear direction. Then, as with the cases 20, 50, locking claw portions 84 are formed at upper ends of a front wall portion 79 and a rear wall portion 80 of the side wall portion 78. Additionally, flange portions 85 are formed at upper end sides of a left wall portion 81 and a right wall portion 82 of the side wall portion 78 so as to extend a full length of the left and right wall portions 81, 82 substantially along the bottom wall portion 76. The flange portions 85 also extend outwards to the left and right. In the case 75 of the fourth embodiment, the flange portions 85 are bent downwards at front end sides thereof so as to extend as far as left and right side portions of the front wall portion 79, and the bent portions at front end 85a sides of the flange portions 85 are made into attaching piece portions 86 to which attaching pieces 11B (refer to chain double-dashed lines in FIGS. 12 and 13) of an air bag cover 5B are attached. Locking piece portions 89 which extend outwardly from a left edge and a right edge of the front wall portion 79 are superposed on the attaching piece portions 86. The locking piece portions 89 and the attaching piece portions 86 are attached to the attaching pieces 11B formed on the air bag cover 5B with bolts B and nuts N (refer to chain double-dashed lines in FIG. 13) which are attaching devices. As with the case 20 of the first embodiment, crimp portions 87 are formed at rear end 85b sides of the flange portions 85 (refer to FIG. 11). In the case 75 of the fourth embodiment, in attaching the air bag cover 5B to the case 75, projecting piece portions 95 which extend from front wall configuring portion 93 which configures the front wall portion 79 are fastened together with the attaching piece portions 86 which are formed at the front end 85a sides of the flange portions 85 of the left wall portion 81 and the right wall portion 82 and are then attached to the attaching pieces 11B of the air bag cover 5B, whereby the front wall portion 79 is connected to the left wall portion 81 and the right wall portion 82. Then, a rear wall configuring portion 96 which configures the rear wall portion 80 and a left wall configuring portion 101L and a right wall configuring portion 101R which configure the left wall portion 81 and the right wall portion 82, respectively are connected together by the crimp portions 87 which are formed at rear end 85b sides of the flange portions 85. Tus, the side wall portion 78 is formed into a substantially quadrangular prism-like shape by connecting the rear wall portion 80 to the left wall portion 81 and the right wall portion 82.

Figure 14:
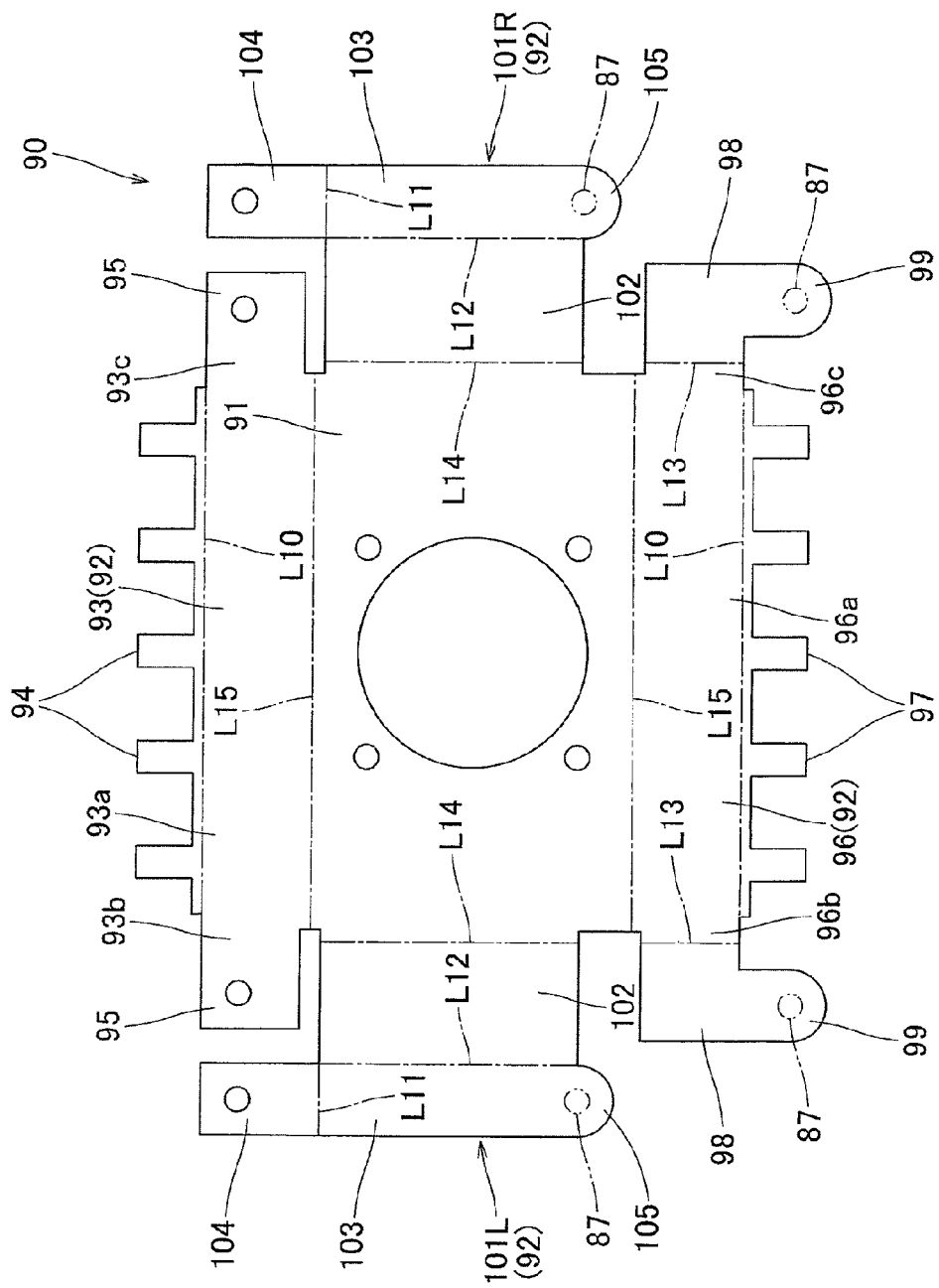
FIG. 14 is a development view in plan of a case material of which the case according to the fourth embodiment is made.

The case 75 of the fourth embodiment is formed by punching a case material 90 as shown in FIG. 14 from a metallic sheet material and bending the case material 90 at locations of folds L10 to L15.

The case material 90 includes, as shown in FIG. 14, a substantially rectangular bottom wall configuring portion 91 which configures the bottom wall portion 76, and four side wall configuring portions 92 which extend individually from four sides on an outer circumferential edge of the bottom wall configuring portion 91. The side wall configuring portions 92 are a front wall configuring portion 93 which configures the front wall portion 79 of the side wall portion 78, the rear wall configuring portion 96 which configures the rear wall portion 80, the left wall configuring portion 101L which configures the left wall portion 81 and the right wall configuring portion 101R which configures the right wall portion 82. The left wall configuring portion 101L and the right wall configuring portion 101R are formed laterally symmetrical in shape with each other.

The front wall configuring portion 93 has a substantially rectangular shape whose width dimension in the left-to-right direction substantially coincides with a width dimension of the bottom wall configuring portion 91 in the left-to-right direction. Claw configuring portions 94 which configure the locking claw portions 84 are formed on a distal end side (an upper end 93a when the case is formed) of the case material 90 which is deployed flat which lies far from the bottom wall configuring portion 91 so as to project therefrom. Projecting piece portions 95 are formed at upper end sides of a left edge 93b side and a right edge 93c side of the front wall configuring portion 93 so as to extend outwards to the left and right. In forming the case 75, the projecting piece portions 95 are superposed on the attaching piece portions 86 which extend from the flange portions 85 on front sides of the attaching piece portions 86 in the front-to-rear direction, and in attaching the air bag cover 5B to the case 75, the projecting piece portions 95 are fastened together with the attaching pieces 11B of the air bag cover 5B to the attaching piece portions 86.

The rear wall configuring portion 96 has a substantially rectangular shape whose width dimension in the left-to-right direction substantially coincides with the width dimension of the bottom wall configuring portion 91 in the left-to-right direction. Claw configuring portions 97 which configure the locking claw portions 84 are formed on a distal end side (an upper end 96a when the case 75 is formed) of the case material 90 which is deployed flat which lies far from the bottom wall configuring portion 91 so as to project therefrom. Extension portions 98 are formed at a left edge 96b side and a right edge 96c side of the rear wall configuring portion 96. The extension portions 98 extend outwards of the case material 90 which is deployed flat and extend towards the left wall configuring portion 101L and the right wall configuring portion 101R (inwards in the front-to-rear direction) when the case 75 is formed. The extension portions 98 are formed to extend a full vertical length of the rear wall configuring portion 96 (the side wall portion 78) and each include a projecting portion 99 which projects further upwards than an upper edge 96a of the rear wall configuring portion 96. The projecting portions 99 configure joining piece portions which are superposed on rear end portions 105 of flange configuring portions 103 of the left wall configuring portion 101L and the right wall configuring portion 101R so as to be joined to the rear end portions 105 when the case 75 is formed.

The left wall configuring portion 101L and the right wall configuring portion 101R each include a substantially rectangular main body portion 102 which configures the left wall portion 81 or the right wall portion 82 and the flange configuring portion 103 which extends from an upper edge side of the main body portion 102 to form the flange portion 85. In the case of this embodiment, the main body portion 102 has a width dimension in the front-to-rear direction which is set slightly smaller than a width dimension of the bottom wall configuring portion 91 in the front-to-rear direction. The flange configuring portion 103 is formed to extend a full length of the main body portion 102 in the front-to-rear direction, and a front end side portion of the flange configuring portion 103 projects to the front from the main body portion 102. A front end side portion 104 of the flange configuring portion 103 configures the attaching piece portion 86 which is bent so as to project downwards from the flange portion 85 and is fastened together with the projecting piece portion 95 of the front wall configuring portion 93 when the case 75 is formed. The rear end portion 105 which lies at a rear end side of the flange configuring portion 103 configures a joining piece portion which is superposed on the projecting portion 99 which is formed at the extension portion 98 of the rear wall configuring portion 96 and is then joined to the projecting portion 99 when the case 75 is formed.

Although a detailed illustration is omitted, the case 75 of the fourth embodiment is fabricated as follows. Firstly, in the case material 90, irregularities are given to the claw configuring portions 94, 97 to form the locking claw portions 84. Folds are formed at the portions of folds L10, and the locking claw portions 84 are bent towards the front wall configuring portion 93 and the rear wall configuring portion 96. At the same time, folds are formed at the portions of folds L11, and the front end side portions 104 are bent towards the flange configuring portions 103. Next, folds are formed at the portions of folds L12, the flange configuring portions 103 are bent towards the main body portions 102. Thereafter, folds are formed at the portions of folds L13, the extension portions 98 are bent towards the rear wall configuring portion 96. Next, folds are formed at the portions of folds L14, and the left wall configuring portion 101L and the right wall configuring portion 101R are bent so as to rise from the bottom wall configuring portion 91. Thereafter, folds are formed at the portions of folds L15, and the front wall configuring portion 93 and the rear wall configuring portion 96 are bent so as to rise from the bottom wall configuring portion 91. As this occurs, the extension portions 98 are disposed so as to cover inner sides of the left wall configuring portion 101L and the right wall configuring portion 101R. In addition, the projecting portions 99 of the extension portions 98 are disposed so as to be superposed on upper sides of the rear end portions 105 of the flange configuring portions 103, and the projecting portions 99 and the flange portions 85 (the flange configuring portions 103) both become substantially parallel to the bottom wall portion 76. Further, the projecting piece portions 95 formed on the front wall configuring portion 93 are disposed so as to be superposed on the attaching piece portions 86 in the front-to-rear direction on the front sides of the attaching piece portions 86. Thereafter, the projecting portions 99 which configure the joining piece portions and the rear end portions 105 of the flange configuring portions 103 are partially crimped together in the direction (the up-to-down direction) which is substantially at right angles to the bottom wall portion 76 by TOX caulking to thereby form the crimp portions 87. Thus, the case 75 can be fabricated. Then, in the case 75 of the fourth embodiment, the crimp portions 87, 87 are provided at the two locations near the rear end corner portions of the side wall portion 78. In addition, in attaching the air bag cover 5B to the case 75 after an air bag and an inflator, which are not shown, are accommodated in an interior of the case 75, the attaching piece portions 86 and the projecting piece portions 95 are fastened together with the attaching pieces 11B of the air bag cover 5B at the two locations near the front end corner portions of the side wall portion 78, whereby the rising configuration of the side wall portion 78 from the bottom wall portion 76 can be maintained.

In the case 75 of the fourth embodiment, too, the projecting portions 99 which are joining piece portions extending from the rear wall configuring portion 96 which is the side wall configuring portion 92 and the flange portions 85 (the flange configuring portions 103) which are the corresponding joined portions (the joining piece portions) are provided substantially parallel to the bottom wall portion 76. The projecting portions 99 are superposed on the rear end portions 105 of the flange configuring portions 103 and are partially crimped together in the direction which is substantially at right angles to the bottom wall portion 76. Namely, in the case 75 of the fourth embodiment, too, the direction in which the projecting portions 99 are crimped to the rear end portions 105 coincides with the direction in which the side wall configuring portions 92 are bent so as to rise from the bottom wall configuring portion 91. Therefore, the crimping step and the bending step can be performed concurrently. Because of this, the case 75 can be fabricated in the single step, thereby making it possible to reduce the number of fabricating steps and cost involved.

In addition, in the case 75 of the fourth embodiment, the number of crimp portions 87 is smaller than that of the case 20 of the first embodiment, and only the two crimp portions 87 are provided. Therefore, compared with the case 20 of the first embodiment, the fabricating costs can be reduced further. In the fourth embodiment, the attaching piece portions 86 are attached to the attaching pieces 11B of the air bag cover 5B. However, the attaching piece portions of the case may be attached to members extending from the body side.

Consequently, the case 75 of the fourth embodiment can be fabricated simply and easily and can reduce the fabricating costs more.

In the embodiments described heretofore, while the case is described as being used in the front passenger seat occupant air bag system, the air bag case to which the invention can be applied is not limited to the front passenger seat occupant air bag system. Thus, the invention can also be applied to cases which are used for a steering wheel air bag system and a knee protection air bag system.

What is claimed is:

1. An air bag case, having a substantially box shape, configured to accommodate a folded air bag and configured to allow the air bag to project from an upper opening portion when the air bag is inflated, the air bag case comprising:
    a bottom wall portion including a bottom wall configuring portion;
    a side wall portion including a side wall configuring portion, wherein:
    the side wall configuring portion is bent so as to rise from an outer circumferential edge of the bottom wall configuring portion of the single metallic sheet material;
    a plurality of joining piece portions, provided on the side wall configuring portion, are superposed on corresponding joined portions to be crimped together to thereby maintain a rising shape of the side wall portion from the bottom wall portion;
    the joining piece portions are disposed substantially parallel to the bottom wall portion together with the joined portions and are superposed on the joined portions so that the joining pieces portions and the joined portions are partially crimped together in a direction which is substantially at right angles to the bottom wall portion;
    the side wall configuring portion includes a plurality of side wall configuring members provided along an outer circumferential edge of the bottom wall configuring portion;
    the joined portions are formed as the joining piece portions which are provided on the side wall configuring portion; and
    the joining piece portions which correspond to each other are crimped together.

2. The air bag case according to claim 1, wherein:
    the side wall configuring members are provided so as to extend from four sides along the outer circumferential edge of the bottom wall configuring portion having a substantially rectangular shape; and
    the joining piece portions which correspond to each other are provided on respective edge side portions of the side wall configuring members which lie adjacent to each other.

3. An air bag case, having a substantially box shape, configured to accommodate a folded air bag and configured to allow the air bag to project from an upper opening portion when the air bag is inflated, the air bag case comprising:
    a bottom wall portion including a bottom wall configuring portion;
    a side wall portion including a side wall configuring portion, wherein:
    the side wall configuring portion is bent so as to rise from an outer circumferential edge of the bottom wall configuring portion of the single metallic sheet material;
    a plurality of joining piece portions, provided on the side wall configuring portion, are superposed on corresponding joined portions to be crimped together to thereby maintain a rising shape of the side wall portion from the bottom wall portion; and
    the joining piece portions are disposed substantially parallel to the bottom wall portion together with the joined portions and are superposed on the joined portions so that the joining pieces portions and the joined portions are partially crimped together in a direction which is substantially at right angles to the bottom wall portion;
    the side wall configuring portion includes a plurality of side wall configuring members provided along an outer circumferential edge of the bottom wall configuring portion; and
    the joined portions are provided near the outer circumferential edge of the bottom wall configuring portion.

4. The air bag case according to claim 3, wherein:
    the side wall configuring members include part configuring portions which are provided so as to extend from two facing sides of the outer circumferential edge of the bottom wall configuring portion having a substantially rectangular shape and which configure part of the side wall portions on the other two facing sides of the outer circumferential edge of the bottom wall configuring portion; and
    the joining piece portions are provided on the part configuring portions.

* * * * *